Sept. 11, 1945.  A. BLAIN  2,384,722
FACSIMILE RECORDER
Filed Oct. 24, 1942
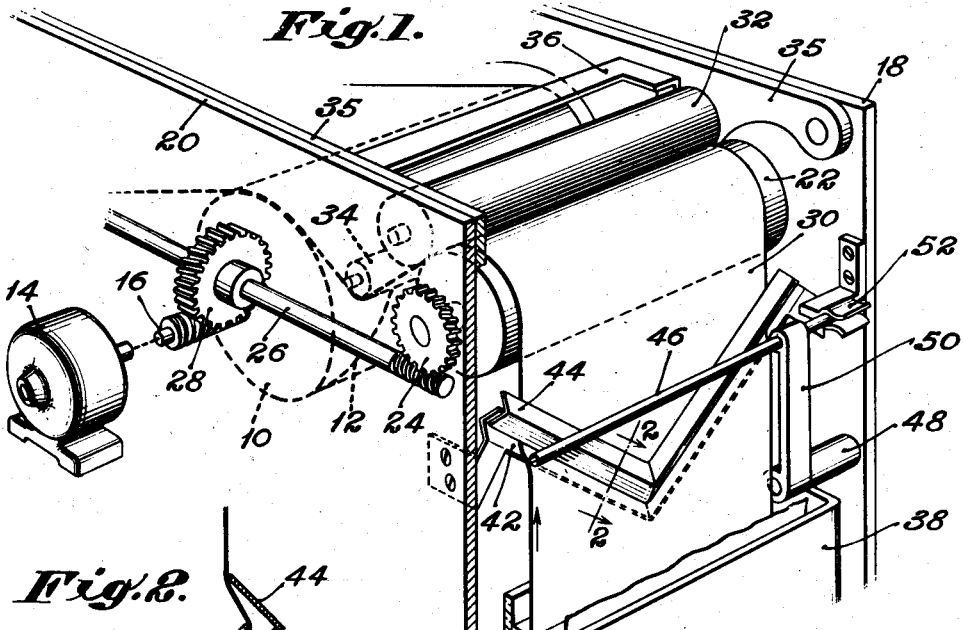
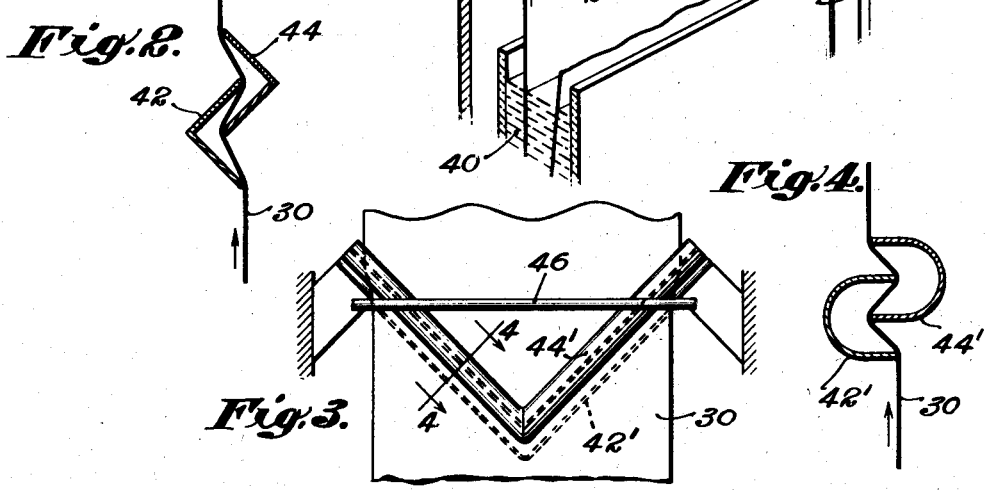
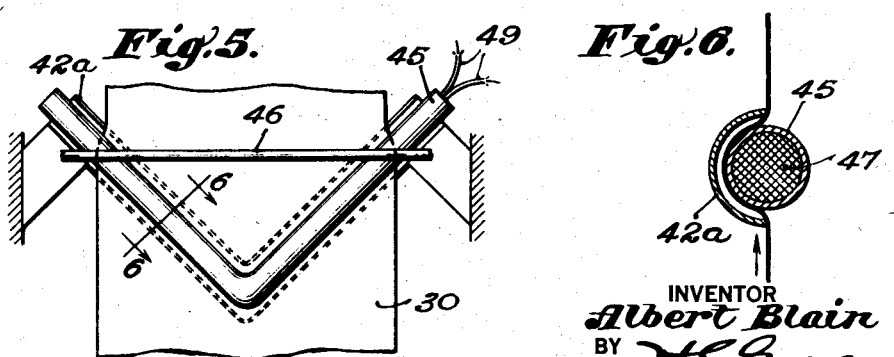
INVENTOR
Albert Blain
BY *N. S. Grover*
ATTORNEY Patented Sept. 11, 1945

2,384,722

UNITED STATES PATENT OFFICE 2,384,722

FACSIMILE RECORDER

Albert Blain, Philadelphia, Pa., assignor to Radio Corporation of America, a corporation of Delaware Application October 24, 1942, Serial No. 463,195

4 Claims. (Cl. 234—76)

This invention relates to an improvement in facsimile recorders or receivers, and more particularly to an improvement in recorders of the electrolytic or wet type.

In producing electrolytic facsimile recordings, a sheet of impregnated or chemically treated paper is passed between the facsimile recording electrodes, and current or potential variations are applied to the electrodes in order to cause a current flow through the treated record receiving paper. By reason of the action of the current flow, together with a reaction with one of the electrodes in some instances, a recording is produced on the record receiving paper generally through the production of a dye.

Various chemical solutions may be used in the production of recordings, and examples of certain chemical solutions that may be used are disclosed in Solomon Patent No. 2,306,471, issued on December 29, 1942.

Inasmuch as the recordings are produced as the result of a flow of electric current through the record receiving paper, it is preferable that the paper be moist at the time it reaches the recording electrodes in order to facilitate the flow of electric current and in order to assist in the production of the desired markings. The amount of moisture contained in the paper at the time the recording is produced thereon is somewhat critical since, if the paper is too moist, streaking or fusion of the markings will result while on the other hand, if the paper is too dry, the intensity and fidelity of the markings will be impaired. In electrolytic facsimile receivers, various systems have been devised for controlling the amount of moisture contained in the record receiving paper at the time it reaches the recording electrodes, and in such systems a heater is normally employed to drive off excessive moisture so that the moisture content of the paper may be reduced to the desired amount. One system for controlling the amount of moisture contained in the record receiving paper is that shown and described in the U. S. patent to Shankweiler, No. 2,227,109, issued on December 31, 1940, and a further example of a means for controlling the amount of moisture contained in the record receiving paper is shown and described in Artzt application Serial No. 459,137, filed on September 21, 1942.

The pretreated or chemically impregnated paper may be supplied to the recording apparatus from a treated supply roll, or the paper may be supplied from an untreated roll, the paper being passed through an impregnating bath after leaving the roll but prior to its being introduced into the facsimile recorder proper. When the paper is impregnated just prior to its being used, it is normally passed through an electrolyte or a bath which contains the desired chemicals to produce the desired recording. Inasmuch as the paper passes through the machine at a relatively slow rate, the paper has sufficient time to absorb the necessary moisture during its travel through the electrolyte bath. After the paper emerges from the bath, however, it is highly desirable that all excess moisture be removed therefrom, and furthermore, it is desirable that the moisture content of the paper be reduced to an optimum value, as stated above.

The present invention, therefore, is concerned with the provision of a means for removing excess moisture from the record receiving paper after it leaves the treating bath, but before it reaches the recording electrodes.

Since the record receiving paper is subjected to a liquid solution or electrolyte, the absorption of the electrolyte by the paper causes the paper to expand, and it has been found that the degree of expansion is not uniform throughout the entire surface of the record receiving paper. As a result, the paper frequently is applied to the recording apparatus in a wrinkled form, so that it is difficult to cause the paper to travel through the machine in the desired manner. It is, therefore, desirable that the paper be introduced into the facsimile recorder in a flat and smooth condition in order that it may proceed through the recorder without interfering with the recording action and without introducing the possibility of tearing the paper by the recording electrodes.

The present invention is, therefore, further concerned with the provision of means for stretching or smoothing the paper after it emerges from the electrolyte bath and before it is introduced into the recording machine.

The present invention also contemplates the use of a heater associated with the means for removing excess moisture and for stretching the paper in order that the moisture content of the paper may be reduced to an optimum value.

Furthermore, when the paper emerges from the recording electrodes, a certain amount of moisture is still contained in the paper, and inasmuch as it is desirable that the recordings emerge from the recording apparatus in a dry condition, the present invention also provides means whereby the paper may be finally dried and smoothed so that it emerges from the machine in a more directly usable condition and without containing any appreciable amount of moisture.

One purpose of the present invention, therefore, resides in the provision of means whereby excessive moisture may be removed or scraped from the surface of the paper after the paper emerges from the electrolyte bath.

Another purpose of the present invention resides in the provision of means in an electrolytic facsimile recorder for stretching or smoothing the paper prior to its being introduced into the recording apparatus proper in order to remove all wrinkles that might be introduced by reason of the absorption of the electrolyte by the paper.

Still another purpose of the present invention resides in the provision of means for removing excess moisture or liquid from the surface of the treated paper in an electrolytic recording apparatus, and for also driving off a predetermined amount of moisture in order that the paper will contain a predetermined amount of moisture at the time it reaches the recording electrodes.

A still further purpose of the present invention resides in the provision of means whereby the paper may be finally dried and smoothed after a recording has been placed thereon in an electrolytic recording apparatus.

A further purpose of the present invention resides in the provision of means for removing excessive moisture from the paper, and for smoothing the paper, the moisture removing means being so positioned as to permit the paper to be easily positioned in the apparatus initially.

Other purposes and advantages of the present invention will become more apparent to those skilled in the art from the following detailed description, particularly when considered in connection with the drawing, wherein like reference numerals represent like parts, and wherein Figure 1 shows a portion of an electrolytic facsimile recorder;

Figure 2 is a detailed showing of the moisture removing means taken along section lines 2—2 of Figure 1;

Figure 3 shows a modification of the present invention;

Figure 4 is a section along lines 4—4 of Figure 3;

Figure 5 is a further modification of the present invention; and

Figure 6 is a section along lines 6—6 of Figure 5.

Referring now to the drawing and, more particularly, to Figure 1 thereof, there is shown a portion of an electrolytic facsimile recorder which includes a recording drum 10 which is provided with the usual conducting helix 12. The recording drum is rotated by means of a motor 14 which, for the purpose of illustration, is shown as coupled directly to the shaft 16 of the recording drum. The recording drum is positioned between a pair of spaced support brackets 18 and 20, the latter being broken away in order to more clearly disclose the invention.

Positioned between the support brackets 18 and 20 is a feed roller 22. The feed roller is driven by means of the worm and pinion gear 24 which is connected to the shaft 26, shaft 26 being rotated by means of the motor 14 through the worm and pinion gear element 28.

In order to retain the record receiving paper 30 in frictional contact with the feed roller 22, an idler roller 32 is provided and, in actual practice, the idler roller 32 is spring pressed or resiliently mounted in order to apply the required amount of pressure to the record receiving paper 30 to prevent it from slipping or moving with respect to the feed roller 22. A guide rod or roller 34 is also provided for properly positioning the paper with respect to the recording drum. The idler roller 32 and guide rod or roller 34 are carried by a cover member, a portion of which is shown at 36.

The recorder also includes a printer bar (not shown) which is attached to the printer bar support member 38 carried by the cover member. The printer bar, as is well known to those skilled in the art, cooperates with the helix 12 of the printer drum in order to produce the line scanning action, and in order to produce the desired markings on the paper 30 when an electric current is passed between the printer bar and the helix 12. Inasmuch as the present invention is not concerned with the specific details of the recorder per se, it is not believed that a further discussion of the construction of the recorder is necessary, particularly in view of the fact that a preferred form of an electrolytic recorder is shown in the above mentioned Artzt application.

The paper is supplied from a supply roll (not shown) and is fed into an electrolyte tank 38, which contains a chemical solution 40. The direction of travel of the paper is indicated by the arrow in Figure 1, and as the paper emerges from the electrolyte, a certain amount of moisture will be carried by the surface of the paper. In order to remove this excessive moisture, a pair of doctor blades or scraping means is provided. One of these doctor blades 42 is permanently attached to the support brackets 18 and 20, whereas the other doctor blade 44 is attached to a support rod 46. For supporting the blade 44 in its proper position with respect to the stationary blade 42, a pair of support posts or studs 48 is provided, one of which is shown attached to the bracket 18. A link member 50 is provided between the rod 46 and support post 48 in order that the doctor blade 44 may be swung out of contact with the paper 30. The rod 46 may be rotationally supported within the end of the link member 50 or a rigid connection may be provided at this point if the pivot post 48 is positioned below the apex of the doctor blades 42 and 44. In either event the link member 50 is permitted to rotate or pivot on the end of the stud or post 48.

In order that the doctor blade 44 may be retained in proper position with respect to the blade 42, a pair of clips 52 is provided, one of which is shown attached to the support bracket 18. The other clip is not shown, since the end of the other support bracket 20 is broken away in order to more clearly show the relationship of the doctor blades to the paper. The clip is provided with a resilient bifurcated portion in order to cooperate with the end of the support rod 46. The clip performs the function of retaining the doctor blade 44 in cooperative position with respect to one side of the paper, and also determines the position of the blade 44 with respect to the blade 42.

When it is desired to initially thread the paper through the receiver, the rod 46 is pulled out of engagement with the clips 52 and swung about the post 48, thereby separating the outer blade 44 (which is carried by the rod 46) from the inner blade 42 in order that the paper may be inserted between the two doctor blades. The cover member over the feed roller and the printing drum is then lifted in order that the paper may be installed in its proper position within the recorder proper. A preferred form of the construction of the cover member and its relation to the feed roller and the printing drum is shown and described in Blain application, Serial No. 460,615, filed October 3, 1942. After the paper has been installed in the machine, then the doctor blade 44 is swung into its proper position with respect to the paper 30 and with respect to the blade 42, the movable doctor blade 44 being retained in its proper position by means of the clips 52.

Naturally, when the paper 30 emerges from the impregnating bath, a surplus amount of the chemical solution will adhere to the exterior surface of the paper. As the paper passes between the doctor blades 42 and 44, this surplus liquid is removed, and since the center of the paper first comes in contact with the doctor blades, the paper is stretched from its center line outwardly in each direction toward each edge of the paper. This stretching action is a result of the particular construction of the doctor blades, and the fact that they are V-shaped. Naturally, the paper tends to follow the edges of the doctor blades with which it comes in contact, and as a result, each half of the paper tends to move outwardly, resulting in a tensioning of the paper 30 across its width. Due to the absorption of the electrolyte, the paper may expand slightly, resulting in an increased width as indicated in Figure 3. The paper is then directed to the feed roller 22 in a flat condition with all wrinkles removed, and with all surplus electrolyte scraped therefrom.

Figure 2 of the drawing shows, in section, the construction of the doctor blades and their relation with respect to each other, the cross section being taken along section lines 2—2 of Figure 1. In this particular modification, the doctor blades are V-shaped in cross section, and are positioned in a staggered or interlaced cooperating manner. Each blade 42 and 44 is also V-shaped with the apex directed toward the electrolyte tank 38, i. e. opposite to the direction of travel of the paper.

Naturally, it is not necessary that the doctor blades be V-shaped in cross section, and in Figures 3 and 4 a modification is shown in which the doctor blades 42' and 44' are U-shaped in cross section. Here again each of the doctor blades is V-shaped with the apex of the V directed toward the electrolyte tank 38. The function of the blades in the modification shown in Figures 3 and 4 is the same as that described above in connection with Figures 1 and 2.

In Figures 5 and 6 a still further modification is shown, in which the stationary doctor blade 42a is U-shaped in cross section as in Figure 4, while the movable doctor blade is in the form of a V-shaped tubular member 45. Positioned within the tubular member is a heater 47 to which an electric current may be applied by means of the terminals 49. The purpose of the heater is to reduce the moisture content of the paper in order that the paper will not be too wet at the time it is subjected to the recording currents. The stationary doctor blade 42a, together with the cooperating tubular member 45 scrape off the surplus electrolyte from the surface of the paper 30, while the heat supplied by the heating element 47 within the tubular member 45 assists in driving off part of the moisture that is retained within the paper. The amount of heat supplied to the heating element 47 depends upon the amount of moisture that has been absorbed by the paper, and the ambient temperature and humidity conditions prevailing at the time. If the air is particularly dry, then a certain amount of the moisture contained in the paper will naturally evaporate during the time the paper travels from the doctor blade 42a to the recording electrodes and only a small amount of heat will be necessary, whereas if the atmosphere is relatively humid, more heat may be necessary to reduce the moisture content of the paper to an optimum value at the time the paper reaches the recording electrodes.

The construction of the doctor blade 42 and the V-shaped tubular heating element 45—47 in Figure 6 is such as will permit it to be directly applied to the facsimile recorder at the point between the immersion tank and the recorder proper. The same elements, however, may be applied to the recorder after a recording has been placed on the paper and, when so positioned in the recorder, the elements will function to smooth the paper after a recording has been made thereon and to completely dry the paper, so that the recordings may emerge from the facsimile recorder in a flat, dry condition. When the modification shown in Figures 5 and 6 is used in the recorder subsequent to the recording action, then the amount of heat supplied to the heating element 46 will depend upon the amount of moisture contained in the paper, and naturally sufficient heat must be supplied to substantially completely dry the paper.

For reasons of simplicity, Figure 1 does not show the application of the combined drying and smoothing elements 42a and 45, shown in Figures 5 and 6, to the recorder after the paper has passed between the recording electrodes, since the application of the elements to the recorder at that location would be obvious to those skilled in the art.

When the modification shown in Figure 5 is situated to cooperate with the paper after a recording has been made thereon and when heat is applied to the heating element 47, the moisture contained in the paper at the time the recording is made thereon will be removed, with the result that the paper will shrink in width during its passage between the doctor blade 42a and the heater rod 45. This shrinkage or decrease in width of the paper is indicated in Figure 5. Naturally, however, if the modification is situated between the tank 38 and the feed roller 22 for removing excess moisture from the surface of the paper and for controlling the moisture content of the paper, the paper will then expand or increase in width, as shown for example in modification represented in Figure 3.

When the modification shown in Figures 5 and 6 is positioned between the immersion tank 38 and the feed roller 22, the heater 45, as explained above, will operate to reduce the moisture content of the paper to an optimum value so that desired recordings may be made. When the modification is positioned in this location, it is then no longer necessary to include a heater in the feed roller 22 as suggested in the above referred to Artzt application, Serial No. 459,137, nor is it necessary to include a heater in the guide roller 34 as suggested in the above referred to Blain application, Serial No. 460,615, filed October 3, 1942.

When the modification shown in Figures 5 and 6 is positioned in the machine such that it will dry the paper after a recording has been placed thereon and simultaneously remove the wrinkles therefrom, it then becomes no longer necessary to include a heater in the final roller, as suggested in the above mentioned Artzt application, inasmuch as the heat supplied by the heater 47 contained within the rod 45 is sufficient to remove substantially all of the moisture from the paper. Furthermore, the ironing action produced as a result of the particular shape of the blade 42a and the heater 45 smooths the paper and makes it unnecessary to provide any other means for smoothing the paper.

Through the use of the present invention, it may therefore be appreciated that provisions have been made whereby it is possible to remove excess electrolyte from the surface of the paper immediately after it comes from the impregnated bath, and to simultaneously tension the paper so that it is fed to the recorder in a flat condition. The two simple elements, namely, the doctor blades, perform both these functions, and when it is desirable to further reduce the amount of moisture contained in the paper, a heating element may be used in connection with one of the doctor blades, as indicated in Figures 5 and 6. Furthermore, it may be appreciated that the present invention may also be applied to a facsimile recorder to finally dry the paper after a recording has been placed thereon, and to simultaneously stretch the paper between its edges in order to remove any wrinkles introduced by reason of the drying action.

Insofar as the present invention is concerned, it is readily conceivable that the modification shown in Figures 5 and 6 could also be applied to an electrolytic facsimile recorder wherein the paper is derived from a pretreated supply roll. In this case, no electrolyte bath would be provided, and no doctor blades would be necessary between the supply roll and the recorder. However, the doctor blades and drier shown in Figure 6 could be associated with the machine to finally dry the paper and to flatten the paper after a recording has been placed thereon.

Although the present invention is shown somewhat in detail in the various figures, it is to be understood that various alterations and modifications may be made therein without departing from the spirit and scope thereof, and it is desired that any and all such modifications be considered within the purview of the present invention, except as limited by the hereinafter appended claims.

Having described my invention, what I claim is:

1. A facsimile recorder of the electrolytic type including an electrolytic bath, supporting means for a record receiving paper supply roll and a feed roller, means for directing the paper from the supply roll through the electrolyte bath to the feed roller, means for rotating the feed roller at a predetermined speed, a V-shaped doctor blade element positioned on each side of the paper and located between the electrolyte bath and the feed roller with the apex of each doctor blade element directed opposite to the direction of travel of the paper, the doctor blade elements being positioned in a staggered relationship and arranged to cooperate with each other, whereby excess surface moisture will be removed from each surface of the paper by the doctor blade elements when the paper is drawn between the elements by said feed roller, and whereby the paper will be tensioned across its width to smooth the paper as it is fed to the feed roller.

2. Apparatus such as defined in claim 1, wherein said doctor blades are V-shaped in cross section in order that excess surface moisture will be removed from the impregnated paper when it is drawn along a tortuous path between the opposed cooperating doctor blades.

3. A facsimile recorder of the electrolytic type including supporting means for a record receiving paper supply roll and a feed roller, means for directing the paper from the supply roll to the feed roller, a V-shaped blade element positioned on each side of the paper and located between the supply roll and the feed roller with the apex of each blade element directed opposite to the direction of travel of the paper, the blade elements being offset and opposed to each other and arranged to cooperate with each other in an interlaced manner, whereby the paper will be tensioned across its width as it is drawn between the blade elements to smooth the paper as it is fed to the feed roller.

4. Apparatus such as defined in claim 1, wherein said doctor blades are U-shaped in cross section and are positioned in a cooperating interlaced manner in order that excess surface moisture will be removed from the impregnated paper when it is drawn between the doctor blades.

ALBERT BLAIN.